Dec. 1, 1931.  F. D. HOLDSWORTH  1,834,589
VALVE MECHANISM
Filed Dec. 29, 1927
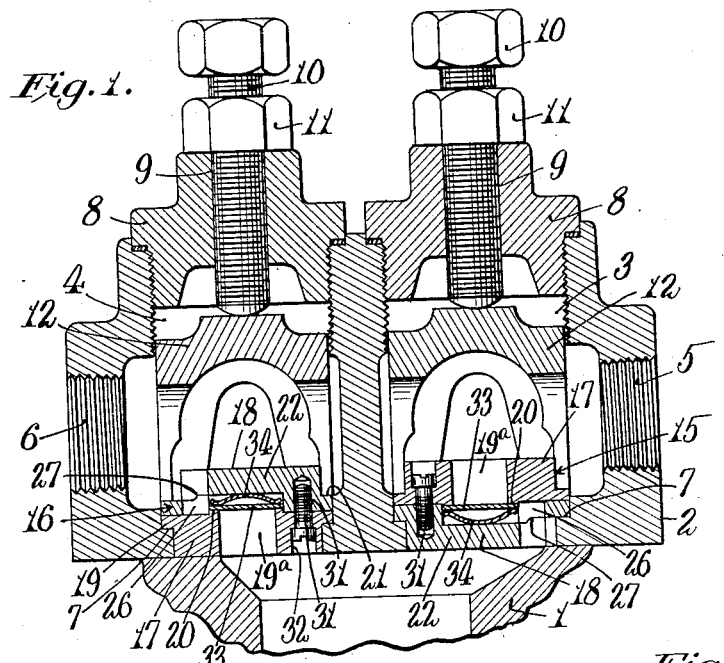
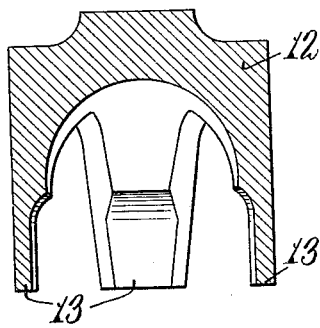
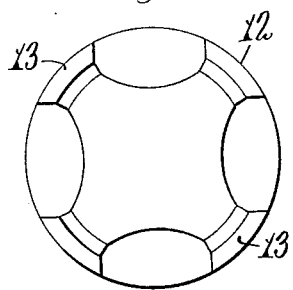
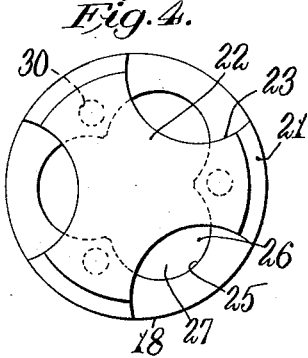
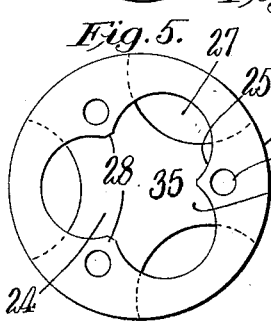
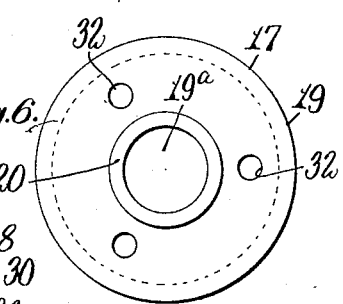
Inventor:
Fred D. Holdsworth.
by Louis A. Waxron
Atty.

Patented Dec. 1, 1931

1,834,589

UNITED STATES PATENT OFFICE

FRED D. HOLDSWORTH, OF CLAREMONT, NEW HAMPSHIRE, ASSIGNOR TO SULLIVAN MACHINERY COMPANY, A CORPORATION OF MASSACHUSETTS

VALVE MECHANISM

Application filed December 29, 1927. Serial No. 243,448.

My invention relates to valve mechanism. An object of my invention is to provide an improved valve mechanism. A second object of my invention is to provide improved and simplified valve mechanism especially adapted for comparatively small air compressors, though it is well adapted for use as a valve mechanism for any character of air compressor. A further object of the invention is to provide an improved valve mechanism comprising a minimum number of parts and constituting a self-contained unit which may be used at will either as an inlet or as a discharge valve. Other objects and advantages of the invention will subsequently appear.

In the accompanying drawings in which for purposes of illustration I have shown one illustrative embodiment of the invention, Fig. 1 is a central vertical section through the upper end of a compressor cylinder head and the valve mechanism.

Fig. 2 is a central vertical section through a valve positioning element.

Fig. 3 is a bottom view of the element shown in Fig. 2.

Fig. 4 is a plan view of a valve guard element.

Fig. 5 is a bottom view of the same element.

Fig. 6 is a plan view of a valve seat element.

Fig. 7 is a perspective of the valve element, and

Fig. 8 is a plan view of a spring element.

Referring to the drawings and first to Fig. 1, it will be noted that upon the upper end of a compressor cylinder casting 1 is seated a valve housing 2. The member 2 is provided with a pair of chambers numbered 3 and 4 arranged at opposite sides of a plane including the axis of the compressor cylinder. An inlet passage 5 opens into the chamber 3 and a discharge passage 6 opens out of the chamber 4. Each of the chambers 3 and 4 is provided at its lower end with a shoulder 7 upon which a valve cage unit may be mounted. The walls of the chambers 3 and 4 are threaded at their upper ends to permit the reception of closure elements 8. Each of these closure elements has a threaded bore 9 in which a follower screw 10 is mounted; and a lock nut 11 serves to hold the follower 10 in any fixed position. Follower or holder elements 12 are provided to maintain the valve units upon the shoulders 7. Each of the elements 12 comprises a member whose feet 13 are adapted to engage and hold in position a valve unit. In the illustrative embodiment of the invention, the valve mechanism as a whole is illustrated as comprising two valve units 15 and 16, unit 15 being an inlet valve unit and unit 16 being a discharge valve unit. Each valve unit comprises a seat element 17 and a cover or guard element 18. The seat element is in the form of a member generally circular in outline, and having at one end a peripheral flange 19, one of whose surfaces is in the plane of the end of the member 17. Member 17 is traversed by a port 19a. Above the plane of the same end of member 17, an annular valve seat portion 20, surrounding port 19a, projects a short distance. The guard or cover element 18 may be formed from a piece of cylindrical stock by turning down the greater portion of the length thereof to leave a peripheral flange 21 extending outwardly from the body portion 22. The body portion is milled at points spaced 120 degrees apart to provide a series of arcuate slots 23, the milling extending inwardly from the periphery. The other end of the cover member is provided with a central bore or recess 24 whose walls are milled away as at 25 to provide a series of outwardly extending lobelike recesses 26 which communicate with the inwardly milled recesses 23 on the other end of the cover member, the communication between the two sets of milled recesses providing openings 27 for the flow of air. The recesses 26 are spaced at their inner sides by walls 28 which serve as guides for opening and closing movements of a valve and valve seating spring. The cover member has threaded openings 30 therein within which screws 31 passing through recesses 32 in the seat member extend. A flat, thin, preferably resilient, preferably metallic disk 33 of substantially the same diameter as the bore 24 and valve seat 20 constitutes the valve; and a transversely bowed resilient spring member 34 constitutes a seating element for the valve and may be disposed with either side thereof adjacent the valve as desired. The inner end of the recess 24, herein designated 35, constitutes a guard surface. It will be evident that to constitute a complete valve unit, a seat element is mounted with the flange 20 projecting into the recess 24, a valve and spring being placed between the seat element and the guard element; and the parts are then held together by screws 31 passing through the recesses 32 and into the threaded bores 30. The complete valve mechanism shown in Fig. 1 is provided by mounting two valve units in mutually reversed relation upon the shoulders 7 of the valve housing 2, placing the followers in engagement with the radially extending flange portions, and locking the parts in position by screwing in the heads 8 and then adjusting and tightening the screws 10.

The mode of operation of the complete mechanism is clearly apparent. Upon the suction stroke of the piston (not shown) of the compressor, air flows through the inlet 5 and chamber 3 through the bores 19ª and unseats the valve 33, and then flows through the recesses 26 and openings 27 and slots 23 into the cylinder. Upon the compression stroke, the valve in the inlet unit closes and the discharge unit opens; and the air flows into the chamber 4 and through the discharge opening 6. From the foregoing description it will be evident that I have provided a very simple and durable valve mechanism which comprises a minimum of parts, the valve seat and cage unit requiring but two parts together with holding means therefor. It will further be evident that adequate flow passage area is provided to insure the minimum of air resistance in the passages.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A valve unit comprising a valve seat member having a port therein surrounded by a valve seat, a valve adapted to cooperate with said seat, no part of said valve extending below the plane of said seat, and a cover member having a bore receiving said valve and having a plurality of flow slots therein each communicating with said bore and opening both through an end wall and the periphery of said cover member, said unit being adapted to be assembled with a support and held in assembled relation therewith by clamping means, and said members each having a radial flange providing a surface adapted in one of the reversed positions of the valve to engage the support and in the other of the reversed positions of the valve to be engaged by clamping means.

2. In combination, a valve seat member having a port therein surrounded by a valve seat, a valve adapted to cooperate with said seat and a cover member having a chamber therein to receive said valve, said chamber having a plurality of lobelike portions separated by valve guiding portions, said lobelike portions having arcuate walls outwardly curved.

3. In combination, a valve seat member having a port therein surrounded by a valve seat, a plate valve adapted to cooperate with said seat, and a disk-like cover member having wall portions defining a chamber for receiving said valve, said chamber having portions of its walls outwardly bowed to provide a plurality of lobelike portions separated by valve guiding portions and having openings in other portions of its walls to provide flow passages opening out of said lobelike portions.

4. In combination, a valve seat member having a port therein surrounded by a valve seat, a valve adapted to cooperate with said seat, and a cover member having a chamber therein to receive said valve, said chamber having a plurality of lobelike portions separated by valve guiding portions and having flow passages communicating with said lobelike portions and passing through the periphery of said member above a plane passing through the seating portion of said valve when in raised positions.

5. In combination a valve seat member having a port therein surrounded by a valve seat, a valve adapted to cooperate with said seat, and a cover member having a chamber therein to receive said valve, said chamber having a plurality of lobelike portions separated by valve guiding portions and having arcuate flow passages extending inwardly from the periphery of said member into intersection with said lobelike portions.

6. In combination, a valve seat member having a port therein surrounded by a valve seat, a valve adapted to cooperate with said seat, and a cover member having in the side facing said seat member a plurality of cylindrical bores substantially overlapping to form a lobed recess receiving said valve, said cover member being provided with flow passages communicating with said recess.

7. In combination, a valve seat member having a port therein surrounded by a valve seat, a valve adapted to cooperate with said seat, a cover member having a chamber therein to receive said valve, said chamber having a plurality of lobe-like portions separated by valve guiding portions, and holding means in said valve guiding portions for holding said cover member and seat member in assembled relation.

8. In combination, a valve seat member having a port therein surrounded by a valve seat, a valve adapted to cooperate with said seat, a cover member having a chamber therein to receive said valve, said chamber having a plurality of lobe-like portions separated by valve guiding portions, and holding means extending through said valve guiding portions in a direction parallel to the axis of said valve for holding said cover member and said seat member in assembled relation.

In testimony whereof I affix my signature.

FRED D. HOLDSWORTH.

CERTIFICATE OF CORRECTION.

Patent No. 1,834,589.            December 1, 1931.

FRED D. HOLDSWORTH.

It is hereby certified that error appears in the printed specification of the above numbered patent requiring correction as follows: Page 2, line 24, for "bores" read bore, line 71, claim 2, before the word "and" insert a comma, and line 76, for "curved" read bowed; same page, line 100, claim 4, for "positions" read position, and line 101, claim 5, after the word "combination" insert a comma; and that the said Letters Patent should be read with these corrections therein that the same may conform to the record of the case in the Patent Office.

Signed and sealed this 6th day of September, A. D. 1932.

(Seal)                                           M. J. Moore,
Acting Commissioner of Patents.